Figure 1:
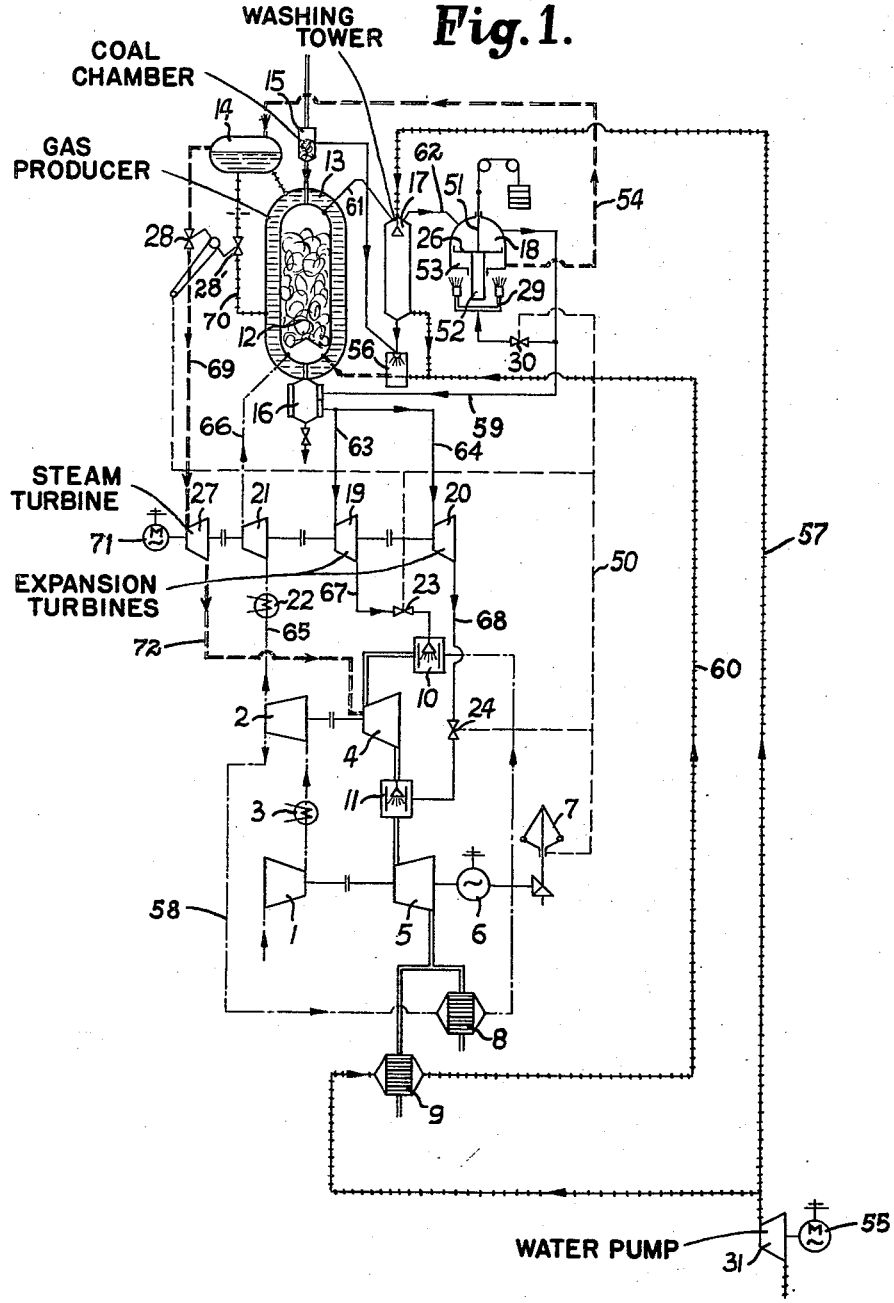

Patented Apr. 20, 1954

2,675,672

UNITED STATES PATENT OFFICE 2,675,672

DEVICE FOR REGULATING GAS SUPPLY OF GAS TURBINE PLANTS

Christian Schörner, Augsburg, Germany, assignor to Maschinenfabrik Augsburg-Nürnberg A. G., Augsburg, Germany, a corporation of Germany Application October 31, 1951, Serial No. 254,056

Claims priority, application Germany November 16, 1950

10 Claims. (Cl. 60—39.12)

This invention relates to a gas turbine plant which is combined with a generator for the production of compressed gas from solid fuel. It is desirable, in order to utilize fully the advantage of the gas turbine, to use coal as a fuel. The combination of an apparatus for gasifying coal under pressure with a gas turbine is a promising solution of this problem which also permits the extraction of valuable substances from the coal.

Depending on the required efficiency and the permissible degree of subdivision of the gas turbine the upper pressure of the cycle is at different levels. The application of the process of the production of pressured gas offers the advantage that the gas for combustion is already available at a pressure which is equal to, or even higher than, the inlet pressure of the gas turbine and that less energy has to be employed for the compression of the air required for the gasification than would be required for the compression of the gases of combustion in case a source for the supply of gas of atmospheric pressure would be available. In order to keep the constructional expenditures for producing a predetermined amount of gas within reasonable limits and with a view to a favorable course of the gasification reactions of the water gas process a working pressure of 20 to 30 atmospheres in the gas producing tank proved to be an optimum value.

It is the object of the present invention to obtain a quick adaptation of the amount of gas delivered by the gas producer or gasifier to the amount of gas required by the gas turbine in case of quick changes of the load.

It would seem that the per se known arrangement providing a substantial pressure difference between the working pressure of the gas producer and the pressure prevailing in the gas turbine cycle in full load condition, which is favorable in many instances, would be particularly suitable for this purpose. In this case, an intermediate compressor is provided for the air for gasification taken from the air supply duct of the gas turbine, the output required for this intermediate compressor being covered entirely or partly by an expansion turbine which is operated by expansion of the gas of combustion produced, from the gasifier pressure down to the pressure of the combustion chambers of the gas turbines. This known system, however, is not sufficient for solving the problem of a quick adaptation of the gas supply to the demand.

According to the present invention a steam turbine is provided additionally for the drive of the intermediate compressor for the air for gasification which is taken from the air supply duct of the gas turbine and has to be compressed to the gasifier pressure. This steam turbine is operated by the pressure from the cooling system of the gas producer, the throughput of steam in case of a change of load of the total plant being temporarily changed in amount by automatic means. This steam turbine is mounted on a common shaft with the above mentioned expansion turbine and the intermediate compressor, said unit making up the charging set for the gasifier. Where it is intended in case of a quick change of the load to transform an existing state in the production of gas to the conditions required for another delivery of gas without losses of gas or delay in the adjustment of the load, this requires a quick adaptation of the speed of the said charging unit which connects the pressure levels of the source of gas and of the gas consumer, i. e. the desirable quick change from one load condition to another is only rendered possible by supplying immediately a correspondingly increased amount of air for gasification.

The energy required for this purpose is provided as follows:

The cooling cover of the gasifier together with a steam receiver having a sufficiently large surface of evaporation forms a steam accumulator which serves to supply the steam turbine. Moreover, a pressure transformer is provided by which changes of pressure occurring in the gasifier are transmitted into intensified changes of pressure in the steam accumulator, thus intensifying the effect of the steam accumulator. In practice, the pressure transformer comprises a differential piston achieving an intensified transmission of the change of pressure in the gas chamber of the gas producer, caused by an increased or reduced demand for gas, compared to the state just left, to the steam accumulator of the cooling system, whereby according to the known properties of a steam accumulator more or less steam is made available for the steam turbine mounted on the shafting of the compressor.

The fact that the reaction pressure of the gas producer is substantially independent of the variations of the process pressure of the gas turbine cycle—whose throughput and output are controlled by changing the inlet pressure—has a favorable effect upon the total consumption of coal, so that for instance, the useless blowing off of excess gas is avoided by the steam accumulator installations.

Owing to the large changes of the suction pressure of the air for gasification in the intermediate compressor—which is equal to the variable inlet pressure of the gas turbine cycle depending on the load—the intermediate compressor must be adapted for very wide differences of the suction pressure: This condition is met especially by so-called screw compressors or rotary sliding vane compressors. Also the expansion turbines for the gases of combustion which are mounted on the shaft of the supercharging unit should be suitable for operation within a wide range of different pressure drops. Radial flow turbines are particularly suitable for this purpose.

According to a further feature of the invention it is advantageous to use the steam from the cooling system of the gas producer—after its expansion in the steam turbine of the compressor set (supercharging unit) additionally intended for the gas producer—for the cooling of the constructional parts serving to fix the blades of the first rotary blade rims of one or more partial turbines of the gas turbine power plant which are operated with a higher temperature. Thus partial flows derived from the gas producer plant and normally not being utilizable in a favorable manner are exploited for increasing the life of highly stressed constructional elements or to improve the thermodynamic efficiency of the total process by permitting an increase of the inlet temperature of the gases of combustion. Apart from the cooling effect for the succeeding turbine stages obtainable by maintaining colder elements of flow in the working fluid in the region of the root circles of the blades, additional output is produced by the further expansion of the steam together with the combustion gases of the gas turbine. In order to provide a sufficient amount of steam from the cooling cover of the gas producer in cooperation with the gas turbine, the internal brick lining of the gas producing chamber may be dispensed with or reduced to a minimum without detriment to the total balance. As is well known, such a construction also eliminates to a large extent disturbances of the reaction in the gas producer by fouling (formation of slag bridges).

Other and further objects, features and advantages of the invention will be pointed out hereinafter and appear in the appended claims forming part of the application.

In the accompanying drawings a now preferred embodiment of the invention is shown by way of illustration and not by way of limitation.

Figure 2:
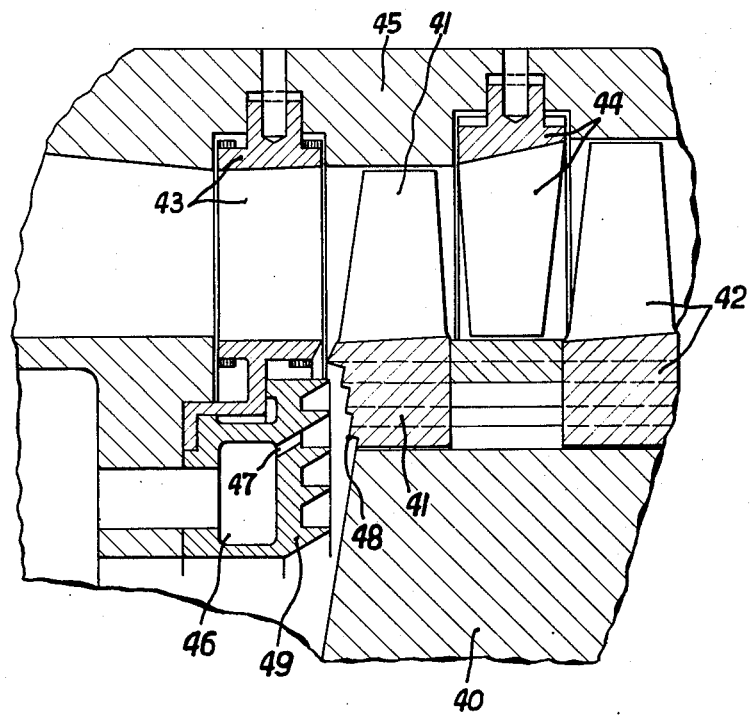

Fig. 1 is a diagram of connection of a plant having the invention applied thereto, and Fig. 2 is a section through a part of the blading of the gas turbine including the additional blade cooling means.

Referring now to the drawings in greater detail, it will be seen that the routes of various fluid media through the apparatus are indicated generally as follows: Gas by a solid line (e. g. 59), steam by a double dash line (e. g. 54), water by a crosshatched line (e. g. 57), and air by a dot and dash line (e. g. 58). In the illustrated embodiment, the gas turbine plan includes two compressors 1 and 2 with an intermediate cooler 3, driven by turbines 4 and 5. The useful output is absorbed by the electric generator 6 whose momentary output condition may be symbolized by the position of the sleeve of the associated centrifugal governor 7 as shown. The gaseous fuel for combustion to drive the plant is produced by a gas producer 12. The exhaust turbine gas heat is utilized in the heat exchangers 8 and 9 for preheating the air for combustion and the water, the latter being carried by conduit 60 and blown into the gas producer in the form of steam on further heating as, for example, in heater 56 where tar or exhaust gas by-products of the heat exchangers are used for combustion. In order to supply the combustion chambers 10 and 11 before the turbines 4 and 5, fuel gas of a correspondingly reduced pressure is supplied from the gas producer, whose substantial elements comprise a reaction chamber 12, conduit 61, a cooling cover 13 with an equalizing vessel or steam accumulator 14 connected thereto, a coal charging chamber 15, a slag or ash receiver 16 and a washing tower 17. The gas is produced and obtained at the pressure of the gas producer amounting to 20 to 30 atmospheres and is allowed to expand on passage through conduit 62 and a small accumulator 18, which is coupled to a pressure transformer to be hereinafter described. From accumulator 18 the gas passes through conduit 59 and on further heating at the slag receiver 16, is expanded to the actual process pressure which depends on the load. This is achieved by the two expansion turbines 19 and 20 supplied by conduits 63 and 64, by which the partial gas quantities to be burnt in the two combustion chambers 10 and 11 are utilized to produce energy for driving the compressor 21 by which the amount of air for gasification, branched off from the combustion air system via conduit 65 and 66, is compressed from the lower pressure level of the gas turbine cycle (also depending on the load) to the pressure level of the gas producer process which should be as uniform as possible. It is preferred to pass this fraction of air preliminarily through an intermediate cooler 22, in order to reduce to a minimum the amount of energy to be supplied by the supercharging unit for compression of the air.

In case of changes of the output an impulse is transmitted from the governor 7, by per se known means indicated at 50, to the throttle valves 23 and 24 disposed in the gas conduits 67 and 68 leading to the combustion chambers 10 and 11, such impulse tending to open the valves where an increase of the load is required and tending to close the valves where a decrease of the load is required. The gas producer should be adapted, with the least possible delay, to this changed amount of gas to be delivered, in order to prevent a useless loss of gas on the one hand (blowing off), or to enable it to meet the desired increase of the load on the other hand. Supposing that the load is suddenly reduced, the throttling of the feed of fuel to be supplied to the combustion chamber as caused by the governor in the first instance means an excess of gas in the gas producer, so that the pressure in the accumulator vessel 18 will at first increase. As shown in Fig. 1, the lower partition wall 26 of this accumulator chamber 18 takes the form of a piston whose opposite side, facing away from chamber 18, is smaller in size, as schematically indicated by the different diameters of the upper and lower parts of the piston rod, shown at 51 and 52. The lower chamber 53 thus formed is connected by a pipe 54 to the steam receiver 14. In the preceding state the forces acting on the two sides of the piston 26 had been in balance; by the sudden rise of the pressure in chamber 18, owing to the hydraulic transmission caused by the different size of the two piston areas a larger change of pressure is produced below the piston 26 which change of pressure is transmitted to the contents of the steam accumulator 14. As a result, according to the per se known charactistics of the steam accumulator, less steam is produced therein. The small steam turbine 27 provided for assisting the drive of the supercharging set (21+19+20) is supplied with less steam, thus also tending to reduce the rotative speed of the compressor 21 which has been initiated already by the expansion turbines 19 and 20 owing to the increased resistance in the discharge ducts 67 and 68 the throttle valves 23 and 24 have been closed. It is also possible to amplify this effect by movements mechanically transmitted from governor 7 to built-in throttle valves 28 and 28' in the steam pipe 69 and compressed conduit 70; moreover, a heating device 29 arranged below the pressure transformer and accumulator 18 in the form of an annular flame may be additionally influenced by a throttle valve 30 connected also to the governor 7. In the present case all that means a further increase of the existing rise of pressure in tank or accumulator 14 by an increase of the supply of heat, and a further reduction of the evaporation. In consequence of the throttling of the feed of fuel gas the upper level of pressure of the gas turbine cycle will decrease and the pressure ratio of the compressor 21 to be overcome by the air for gasification is continuously increasing. True, the expansion pressure ratio of the turbines 19 and 20 is also increased to some extent, but owing to the lag in the readjustment of the throttle device 23 and 24 this takes place with a certain delay.

The reverse case of a sudden increase of the load requires opening of the throttle valves 23, 24 for the combustion gas before the combustion chambers. The momentary deficiency of gas occurring in the reaction chamber 12 and in the storage chamber or accumulator 18 causes a reduction of the pressure which by transmission acts upon the steam accumulator 14, causing a more intensive evaporation therein and supplying a larger amount of propellant to the steam turbine 27 arranged on the shaft of the supercharging set. All other effects take their course accordingly in an opposite direction.

In order to cover the amount of steam required by the plant itself, starting from the water feed pump 31, driven by motor 55, a part of the waste heat of the expanded exhaust gases from turbine 5 is advantageously absorbed by water in the heat exchanger 9, the hot discharge water of the washing tower 17 is then admixed and finally the mixture is further heated in a heating device 56 with combustion of the tar separated at 17 or of the exhaust gas from the coal charging chamber 15. The gas producer 12 and its associated washing tower 17 are operated in known manner for the production of combustible gas from solid coal in the presence of steam and air.

In order to obtain a favorable thermodynamic efficiency of the plant, it is desirable to adapt the thermodynamic cycle as much as possible to the Carnot cycle corresponding to isothermic changes of the state of the fluid (so-called "carnotisation"). To this end, the passage of the working fluid through the plant is more and more subdivided, with intermediate cooling during the compression and intermediate heating during the expansion. By computation it is found that in order to obtain a cycle of this kind, a high cycle pressure of the gas turbine plant is desirable. Since the gas producer pressure for constructional reasons is advantageously kept within the above mentioned range, the pressure difference between the gas producing cycle and the gas turbine cycle is decreasing more and more.

This leads to designs in which the difference of pressure between the gas turbine and the gas producer in the state of full load is practically reduced to the amount required for bridging the loss of pressure of the gas producing process—in this case the compressor required therefor is merely driven by a steam turbine and an auxiliary electromotor 71 so that the expansion turbines 19, 20 may be dispensed with. The electromotor also serves to start operation of the gas producer and to put the same to its working pressure. The water required to produce the steam for the production of pressured gas may be preheated by a water heater arranged at the end of the gas turbine in addition to the preheater for the air for combustion. Thus the heat energy still contained in the exhaust gas of the gas turbine can be recovered to a great extent and the exhaust gas loss can be reduced to a very small amount although the inlet temperatures of the propellant gas before the turbines are limited by the high temperature stability of the materials available nowadays for the critical parts of the turbines.

It will be understood, moreover, that even where a plurality of compressed gas producer vessels are provided to produce the required amount of gas, it is sufficient to provide a single pressure transformer 18 and a single equalizing vessel 14 for the cooling covers of the gas producer, which vessel is designed as a steam accumulator.

It will be seen from Fig. 2 how the exhaust steam of the steam turbine 27 can be utilized to cool the constructional elements of the first and particularly hot stage of a partial turbine of the gas turbine plant. There are shown two rotary blade rims 41 and 42 of the rotor 40 to which the propellant is admitted through the guide blade rims 43 and 44. Arranged at the carrier 45 of the guide blades, within the guide rim 43, is an annular chamber 46 into which the exhaust steam is fed from conduit 72 so as to flow out into the clearance space through bores 47, with expansion. The end face of the rotary blade rim has rib-shaped projections 48 serving to improve the transmission of heat. Moreover, the annular chamber 46 has ring-shaped projections 49 adapted to absorb heat radiated by the hot rotary blade rim.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In a gas turbine power plant of the character described the combination which comprises a gas producer for producing combustion gas from solid fuel, steam producing means for producing steam with reaction heat from said gas producer, a gas turbine, a combustion chamber for supplying driving gas to said turbine, means for supplying combustion gas from said gas producer to said combustion chamber, air supply means for supplying air to said combustion chamber, a compressor for supplying compressed air to said gas producer from said air supply means, a steam turbine for driving said compressor, means for supplying driving steam to said steam turbine from said steam producing means, and automatic means for regulating the quantity of steam supplied to said steam turbine with variations of load on the power output of said gas turbine power plant.

2. In a gas turbine power plant of the character described, the combination which comprises a gas producer for producing combustion gas from solid fuel, steam producing means for producing steam with reaction heat from said gas producer, a gas turbine for producing power output of said plant, a combustion chamber for supplying driving gas to said turbine, means for supplying combustion gas from said gas producer to said combustion chamber, air supply means for supplying compressed air to said combustion chamber and to said gas producer, said air supply means including a compressor for additionally compressing air supply to said gas producer, a steam turbine for driving said compressor, means for supplying driving steam to said steam turbine from said steam producing means, and automatic means responsive to variations in the output of said power plant for controlling the quantity of steam supplied to said steam turbine.

3. In a gas turbine power plant of the character described the combination which comprises a gas turbine for supplying power output, a combustion chamber for supplying driving gas to said gas turbine, a gas producer for producing combustion gas from solid fuel, means for supplying combustion gas from said gas producer to said combustion chamber, air supply means for supplying combustion air to said combustion chamber and reaction air to said gas producer, a compressor for compresing air supplied to said gas producer from said air supply means, a steam turbine for driving said compressor, means for producing driving steam for said steam turbine with reaction heat from said gas producer, means for supplying said steam to said steam turbine, and automatic governing means responsive to variations in output of said plant for regulating the throughput of steam through said steam turbine.

4. In a gas turbine power plant of the character described having a gas turbine for producing power, a combustion chamber for supplying driving gas to said gas turbine, a gas producer for producing combustion gas for said combustion chamber from solid fuel and air supply means for said gas producer and said combustion chamber, the combination which comprises a compressor for supplying compressed air from said air supply means to said gas producer, a steam turbine for driving said compressor, means for producing driving steam for said steam turbine with reaction heat of said gas producer, and automatic means responsive to variations in output of said power plant for temporarily altering throughput of driving steam through said steam turbine with said variations in output.

5. In a gas turbine power plant of the character described having a gas turbine for producing power, a combustion chamber for supplying hot driving gas to said gas turbine, a gas producer for producing combustion gas for said combustion chamber, an air supply means for said gas producer and said combustion chamber, the output of said gas producer varying with the amount of air supplied thereto, the combination which comprises a compressor for supplying compressed air from said air supply means to said gas producer, a steam turbine for driving said compressor, a water cooling system for said gas producer adapted to produce steam from reaction heat of said gas producer, an accumulator in said water cooling system for accumulating steam produced thereby, means for supplying driving steam from said accumulator for driving said steam turbine, and means responsive to variations in the output of said power plant for controlling the throughput of steam through said steam turbine to effect variation in the amount of air supplied to said gas producer with said variations in output of said plant.

6. In a gas turbine power plant of the character described having a gas turbine for producing power, a combustion chamber for supplying hot driving gas to said gas turbine, a gas producer for producing combustion gas for said combustion chamber, an air supply means for said gas producer and said combustion chamber, the output of said gas producer varying with the amount of air supplied thereto, the combination which comprises a compressor for supplying compressed air from said air supply means to said gas producer, a steam turbine for driving said compressor, means for producing driving steam for said steam turbine with reaction heat of said gas producer, a steam accumulator for said driving steam, a gas accumulator for combustion gas produced by said gas producer, throttle means responsive to variations of load on said power plant for altering the amount of combustion gas supplied to said combustion chamber effecting gas pressure variations in said gas accumulator, means for transmitting said pressure variations from said gas accumulator to said steam accumulator to effect variation in the throughput of driving steam through said steam turbine and consequent variation in the amount of compressed air supplied to said gas producer by said compressor.

7. In a gas turbine power plant of the character described having a gas turbine for producing power, a combustion chamber for supplying hot driving gas to said gas turbine, a gas producer for producing combustion gas for said combustion chamber, an air supply means for said gas producer and said combustion chamber, the output of said gas producer varying with the amount of air supplied thereto, the combination which comprises a compressor for supplying compressed air from said air supply means to said gas producer, a steam turbine for driving said compressor, means for producing driving steam for said steam turbine with reaction heat of said gas producer, a steam accumulator for said driving steam, a gas accumulator for combustion gas produced by said gas producer, throttle means responsive to variations of load on said power plant for altering the amount of combustion gas supplied to said combustion chamber effecting gas pressure variations in said gas accumulator, means for amplifying and transmitting said pressure variations from said gas accumulator to said steam accumulator to effect variation in the throughput of driving steam through said steam turbine and consequent variation in the amount of compressed air supplied to said gas producer by said compressor.

8. Apparatus according to claim 7 in which said gas accumulator and said pressure variation amplifying and transmitting means comprise a storage vessel, a movable piston subdividing said storage vessel into a gas chamber and a steam chamber, the surface area of said piston in said gas chamber being substantially greater than the surface area of said piston in said steam chamber effecting amplified transmission of pressure variations in said gas chamber to said steam chamber, and means connecting said steam chamber with said steam accumulator for transmission of said amplified pressure variations thereto.

9. In a gas turbine power plant of the character described having a gas turbine for producing power, a combustion chamber for supplying hot driving gas to said gas turbine, a gas producer for producing combustion gas for said combustion chamber, and a compressor for supplying compressed air to said gas producer, the combination which comprises a steam turbine for driving said compressor, means for producing driving steam for said steam turbine with reaction heat of said gas producer, means for feeding exhaust steam from said steam turbine to said gas turbine, and means for expanding said exhaust steam in said gas turbine effecting cooling of said turbine.

10. Apparatus according to claim 9 in which said gas turbine includes an annular chamber for receiving said exhaust steam, a turbine rotor, a passage from said chamber to said rotor, and means for directing steam expanding from said chamber through said passage across said turbine rotor at the inlet side thereof.

References Cited in the file of this patent

UNITED STATES PATENTS

| Number | Name | Date |
| --- | --- | --- |
| 1,820,725 | Bailey | Aug. 25, 1931 |
| 2,586,025 | Godfrey | Feb. 19, 1952 |
| 2,592,749 | Sédille | Apr. 15, 1952 |

FOREIGN PATENTS

| Number | Country | Date |
| --- | --- | --- |
| 63,991 | Denmark | Oct. 1, 1945 |
| 30,598 | Great Britain | Dec. 31, 1909 |
| 415,788 | Great Britain | Sept. 3, 1934 |